Sept. 8, 1959  J. A. WEEDMAN  2,903,343
APPARATUS FOR SEPARATION AND PURIFICATION
Filed Nov. 30, 1953  3 Sheets-Sheet 1

INVENTOR.
J. A. WEEDMAN
BY
ATTORNEYS

Sept. 8, 1959

J. A. WEEDMAN 2,903,343

APPARATUS FOR SEPARATION AND PURIFICATION

Filed Nov. 30, 1953

INVENTOR.
J. A. WEEDMAN

BY *Hudson and Young*

ATTORNEYS

United States Patent Office 2,903,343
Patented Sept. 8, 1959

2,903,343

APPARATUS FOR SEPARATION AND PURIFICATION

John A. Weedman, Bartlesville, Okla., assignor to Phillips Petroleum Company, a corporation of Delaware Application November 30, 1953, Serial No. 394,957

6 Claims. (Cl. 23—273)

This invention relates to separation and purification of components from liquid mixtures. In one of its more specific aspects, it relates to the separation and purification of liquid multi-component mixtures by fractional crystallization. In another of its more specific aspects, it relates to an improved apparatus for use in processes for crystal separation and purification from liquid mixtures. In yet another of its more specific aspects, it relates to a process for concentrating dilute solutions.

In the separation of chemical compounds, fractional crystallization processes find many applications. There are many instances where separation by distillation or by solvent extraction is impracticable or impossible, and the desired separation can only be carried out by means of fractional crystallization. When it is desired to separate chemical isomers having similar boiling points and solubilities, or materials having relatively high boiling ranges, or thermally unstable substances, or solutions containing both volatile and non-volatile impurities or undesired constituents, separation by fractional crystallization may well be the only practical method which can be employed.

There is the further advantage in using a crystallization method of separation in that this separation method is the only one which theoretically produces a pure product in a single stage of operation. It has been found in actual practice, however, that the crystals obtained from a solution of several components are impure because of the occlusion of mother liquor within the crystal interstices. In the practice of the conventional fractional crystallization processes, the crystal yield from one batch crystallization is redissolved in a solvent or remelted and again crystallized to effect further purification. Since the concentration of impurity in the new liquor is less than in the previous liquor of crystallization, the later crystallized product will have less impurity. Such processes require a large amount of equipment and floor space for their operation with resulting high operating expenditures in terms of labor and equipment cost. Furthermore, in these types of processes a limitation on the purity of product obtained is imposed by the number of stages through which the crystallization is carried.

In my copending application, Serial No. 166,992, filed June 9, 1950, now U.S. Patent No. 2,747,001, I have disclosed a continuous method of separating and purifying liquid multi-component mixtures which overcomes the disadvantages of the conventional fractional crystallization processes. This method involves cooling a liquid multi-component mixture from which the separation is to be made so as to form crystals of at least the higher melting component and thereafter separating them from the mother liquor. The crystals are then introduced into a purification column in one portion of which a melting section is maintained. By means of a piston, the crystals are moved in a uniform, compact mass toward the melting section in the purification column where the crystals are melted. A portion of the melt is withdrawn as product while the remainder is displaced as a reflux stream countercurrently to the movement of crystals and in intimate contact therewith so as to remove the occluded impurities therefrom. The high purity of product obtainable is due primarily to the washing action of the reflux stream passing through the column in intimate contact with the crystals. It has been discovered that by utilizing a crystal purification column having an expanded purification zone, i.e., one in which the purification zone has a substantially larger cross-sectional area than the feeding means employed therewith, a greatly increased rate of product can be obtained which product is of a purity comparable to that produced in the above-described process.

The objects of this invention will be attained by the various aspects of the invention.

It is an object of the present invention to provide an improved continuous process for the separation and purification of multi-component mixtures.

Another object is to provide an improved process and apparatus for separation of components of a liquid mixture from which a component crystallizes upon cooling of the liquid mixture.

A further object is to provide improved fractional crystallization apparatus which utilizes an expanded purification section in relation to the feeding section in order to obtain an increased product yield.

A still further object of the invention is to provide an improved process for concentrating dilute solutions.

Still other objects and advantages will become apparent to those skilled in the art from the following disclosure.

In accordance with the present invention, a liquid multi-component mixture containing a component which crystallizes first upon lowering the temperature of the mixture is introduced into a chiller where it is cooled to a temperature such as to form a slurry of crystals of said component and mother liquor. The crystals are separated from the mother liquor after which they are introduced into a feed arm connected to one end of and extending into an elongated purification column. The crystals are moved through the feed arm by a displacement means such as a piston or auger at least up to the upstream end crystalwise of the purification column, which has a substantially larger cross-sectional area than that of the feed arm. The crystals on entering the purification column completely fill the column, forming a uniform mass of crystals therein. By the force exerted by the crystals entering the column, the crystal mass is moved through the column into a melting zone, maintained in the column downstream of the crystal inlet, at a temperature at least as high as the melting point of the crystals. When the crystals enter the melting zone, at least a portion of the crystals is melted, and a part of the resulting material is withdrawn from that zone as a product in the form of melt or as a mixture of melt and crystals. The remainder of the melt is displaced countercurrently to the movement of crystals and in intimate contact therewith so as to remove occluded impurities from the crystals. This material is removed from the column through an annular filter adjoining the walls of the column and the portion of the feed arm extending into the column. By utilizing the expanded purification column of the present invention it is possible to obtain an increased product rate while utilizing an apparatus which is comparatively inexpensive. In the case where the diameter of the crystal mover and the purification column are the same, the advantages of this invention are not possible of attainment because capacity is limited by the diameter of the purification column.

If an increase in capacity is obtained by increasing the diameter of the purification column while simultaneously increasing the diameter of the feed inlet, a practical limit is soon encountered because of the difficulty of constructing and operating the crystal moving devices, such as reciprocating pistons, of large diameter with reasonable tolerances as to dimensions, clearances, etc. The present invention is based on the discovery that improved operation of the crystal purification column of my abovementioned copending application results when the purification section of the column is enlarged in diameter in relation to the diameter of the feed inlet conduit. The present invention also makes it possible to increase the capacity of the purification column to any desired extent while avoiding the above-mentioned difficulties associated with the crystal moving devices of large diameter.

The fractional crystallization apparatus and process of this invention are applicable to a great number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in my copending application previously referred to, and of particular importance, there may be mentioned separation of systems containing xylenes, systems containing cyclohexane, systems containing normal paraffins, systems containing benzene, and the like. Thus it has been found that paraxylene can be separated from a multi-component mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane. Other organic chemicals that may be mentioned include pyridines, dimethyl phthalates and fatty acids.

The present invention is applicable to inorganic mixtures as well as organic mixtures, and offers a practical method of separating two inorganic compounds between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises when it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the temperature to which the feed is lowered and by varying the amount of liquid passed countercurrently through the moving mass of crystals. This aspect of the invention is, in general, applicable to those situations where it is desired to increase the concentration of a solution by removing at least a portion of the solvent therefrom with a minimum of solute remaining in the removed solvent.

For a more complete understanding of the invention reference may be had to the drawing, in which.

Figure 1:
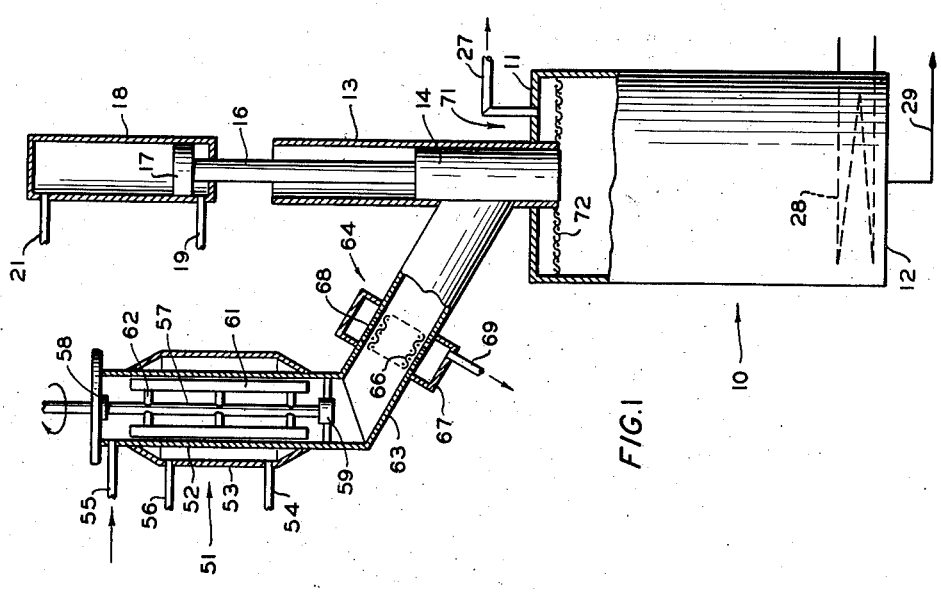
Figure 1 is a diagrammatic elevational view, partly in section, of one arrangement of the apparatus of the invention.

Referring to Figure 1 of the drawing, an elongated crystal purification column 10 is closed at its upper and lower ends by closure members 11 and 12, respectively. Tubular member or feed arm 13, connected to the upper end of column 10, is provided with compacting means, such as an impervious piston 14, connected by a connecting rod 16 to a hydraulic piston 17 in hydraulic cylinder 18. Lines 19 and 21 serve to pass hydraulic fluid alternately into and out of cylinder 18 so as to drive piston 17 which in turn causes the movement of piston 14. Feed arm 13 extends slightly through closure member 11 down into the column. Filter section 71 disposed in the upper end of column 10 comprises annular filter screens 72 attached to the walls of column 10 and to that portion of feed arm 14 extending into the column. Withdrawal of liquid from the filter is effected through liquid outlet line 27. A heat exchange means is provided in the lower end of column 10 in order to maintain a relatively high temperature at that end. As illustrated, the heat exchange means is a coil 28 through which a heat transfer medium is circulated. It is not intended to limit the invention to the specific heat exchange means shown, but other means may be employed. For example, an electrical heater can be positioned next to closure member 12, a coil can be disposed around column 10 at its lower end, or an electrical bayonet type heater may be provided to extend into the end of the purification column. A liquid outlet line 29 is connected to the end of column 10 in order to provide means for removal of melt or a mixture of melt and crystals from the melting zone. Furthermore, while the heat exchange means is shown as being disposed in the downstream end of the purification column, it is within the scope of the invention to locate the heat exchange means in other positions, e.g., in an intermediate portion of the column downstream from the filter section.

Scraped surface chiller 51 comprises a tubular member 52 provided with a refrigeration means which is an annular jacket 53 which is equipped with refrigerant inlet line 54 and refrigerant outlet line 56, by means of which refrigerant is introduced into and withdrawn from the annular space between tubular member 52 and jacket 53. Inlet line 55 connected to tubular member 52 provides means for charging feed materials to the chiller. A shaft 57 centrally disposed within tubular member 52 is supported by means of upper and lower bearings 58 and 59, respectively. A plurality of scraper blades 61, attached to shaft 57 by a series of cross members 62 are positioned in close proximity to the walls of tubular member 52 and extend longitudinally throughout the length of that member. Scraped surface chiller 51 is connected by means of conduit 63 to tubular member or feed arm 13. A filter section 64, provided in conduit 63, comprises filter screen 66 and jacket 67 surrounding perforations such as holes 68 in the walls of the conduit. Line 69 connected to jacket 67 provides for the withdrawal of mother liquor from the crystal slurry.

In order to carry out the process of this invention in the manner contemplated so as to obtain the desired high product rate, the positioning of piston 14 in tubular member 13 during its cycle of operation must be given careful consideration. Accordingly, piston 14 at the end of its compression stroke must reach at least to the end of tubular member 13. It is also within the scope of the invention for piston 14 to extend below the end of tubular member 13 down into column 10. Furthermore, piston 14 must be of such a length that it completely blocks the opening of conduit 63 when at the end of its downward stroke. Still again at the end of its back stroke, piston 14 must have traveled such a distance in feed arm 13 that the opening of conduit 63 into tubular member 13 is free and unobstructed.

Figure 2:
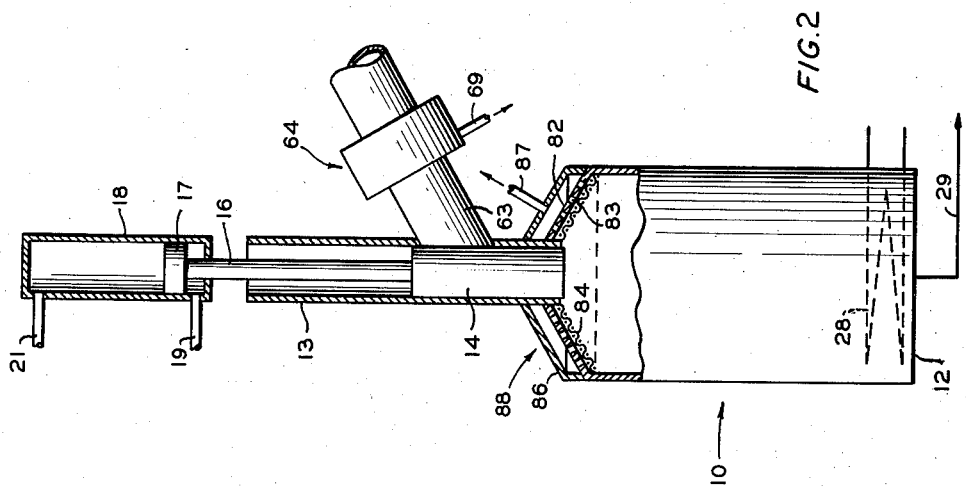
Figures 2 and 3 are diagrammatic elevational views, partly in section, of modifications of Figure 1.

In another modification of the apparatus of Figure 1 as shown in Figure 2, column 10 has a substantially frusto-conical upper closure member 82 perforated as by holes 83 and having a filter screen 84 positioned adjacent thereto. An annular jacket 86 covers holes 83 in closure member 82 and has connected thereto liquid outlet line 87. This arrangement of elements as described comprises filter section 88. Conduit 63 having a filter section 64 is connected to a scraped surface chiller in the same manner as shown in Figure 1. Other elements of the apparatus which have not been described bear the same numerical designation utilized with the previously described figures.

Figure 3:
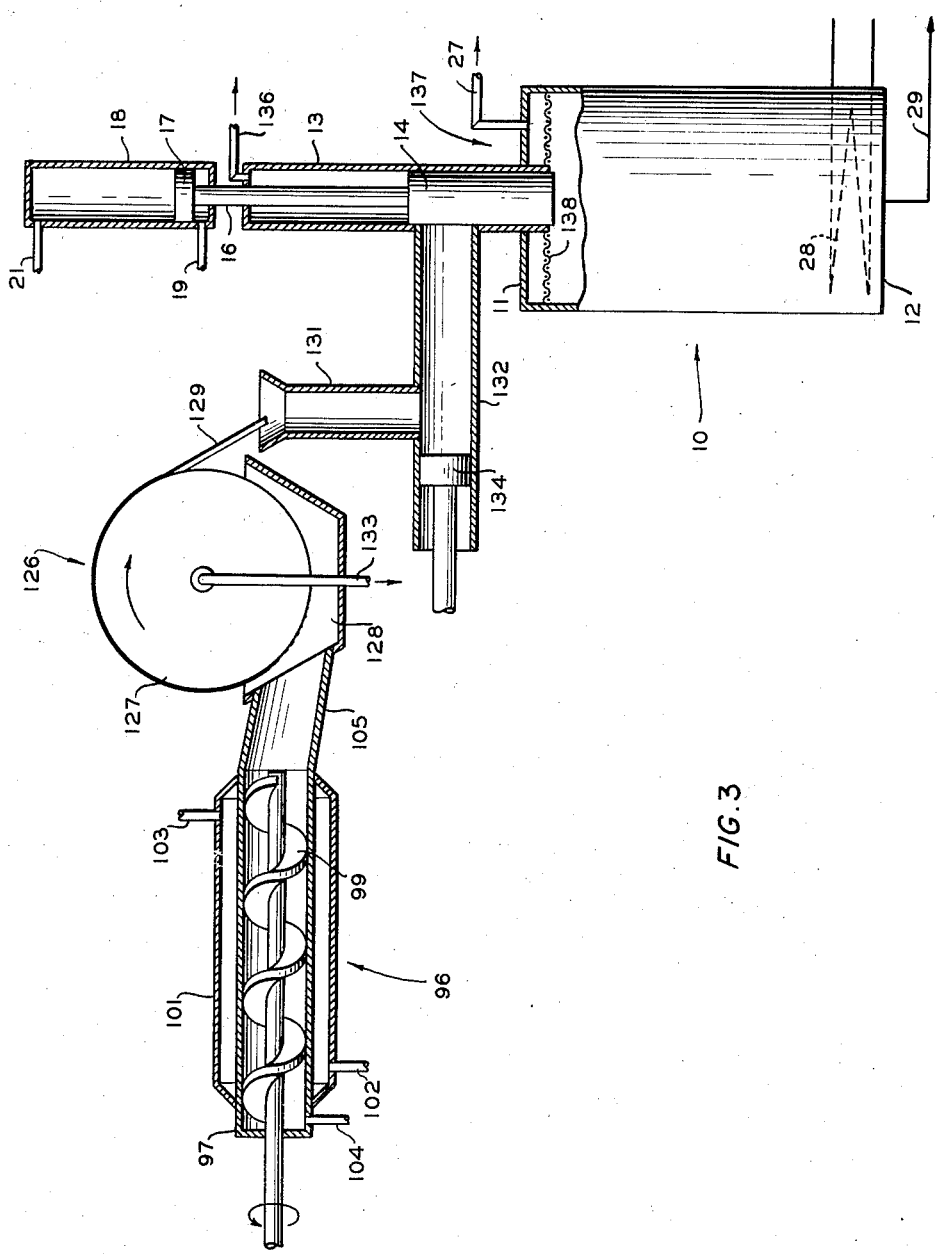

In still another arrangement of apparatus of the invention as illustrated in Figure 3, a rotary filter 126 comprising a substantially cylindrical drum 127 positioned to rotate within container 128 is utilized. Chiller 96 comprises a cylindrical inner section 97 containing an axially disposed shaft 98 having mounted thereon a helix or screw 99. The screw or auger 99 is actuated by a motor, not shown, or other means operatively connected to the outer end of the shaft. A jacket 101 surrounds inner zone 97 in spaced relation so as to provide an annular space for heat exchange fluid. Lines 102 and 103 serve to introduce and withdraw heat exchange fluid or refrigerant to and from the chiller. Line 104 connected to the outer end of cylindrical section 97 provides means for introducing feed material into the chiller. The chiller is connected to container 128 by means of conduit 105. Doctor blade 129, positioned to close proximity to drum 127, provides means for removing crystals from the rotary filter while conduit 131 with its open, flared upper end disposed below doctor blade 129 is connected to cylinder 132. The mother liquor separated in rotary filter 126 is recovered through line 133. Piston 134 which is positioned in cylinder 132 and operatively connected to a hydraulic driving means, not shown, provides means for moving crystals into tubular member or feed arm 13. Piston 14 as illustrated is porous, being pervious to liquid and impervious to crystals. Line 136 is connected to the upper end portion of feed arm 13 in order to provide means for withdrawing mother liquor which passes through porous piston 14.

Feed arm 13, attached to the upper end of crystal purification column 10, extends slightly through closure member 11 down into the column. Filter section 137, disposed in the upper end of column 10, comprises annular filter screen 138 attached to the walls of column 10 and to that portion of feed arm 13 extending into the column. Other elements of Figure 3 are similar to those described in conjunction with the preceding figures and have been designated by identical reference numerals. It is noted that, as in Figure 1, piston 14 is so constructed that at the end of its compression stroke it extends at least up to the end of column 10 and completely blocks the entrance of cylinder 132 into feed arm 13.

While the crysal purification columns have been illustrated and for convenience described as occupying a substantially upright position, it is not intended to so limit the invention. Accordingly, although the vertical position is preferred, it is within the scope of the invention to operate the columns in other positions, e.g., a horizontal position. In describing the apparatus of this invention, several types of chillers have been mentioned, but it is to be understood that any of these chillers or other suitable crystallizers can be utilized with any of the crystal purification columns of the invention. Still again, while the feed pistons of Figures 1 to 3, inclusive, are shown as being impervious, it is to be understood that porous pistons can be used. When using a porous piston instead of an impervious piston, a liquid outlet line is provided in the top of the feed arm for withdrawal of liquid from the column as illustrated in Figure 3. A rotary filter similar to that shown in Figure 3 can be used in conjunction with the other fractional crystallization apparatus of this invention in order to separate mother liquor from the crystals prior to introduction into the purification column. It is also within the scope of the invention to operatively connect a heating means to any of the crystal purification columns of the figures so as to supply, if desired, a small amount of heat to the walls of the columns in order to lubricate the columns and prevent any sticking of the crystals which might occur therein.

In the operation of the apparatus of Figure 2, a liquid feed mixture is introduced through line 55 into scraped surface chiller 51. Refrigerant is passed into the annular space between tubular member 52 and annular jacket 53 through line 54 and withdrawn therefrom through line 56 at a rate sufficient to maintain scraped surface chiller 51 at a temperature low enough to crystallize one of the components of the feed mixture. Because of the low chiller temperature, crystals of one component are frozen out, thus forming a slurry of crystals and mother liquor. Shaft 57 is slowly rotated, thus causing scraper blades 61 to remove any crystals forming on the walls of tubular member 52. The slurry of mother liquor and crystals flows downwardly through chiller 51 and enters conduit 63 containing filter section 64. The crystals are separated from mother liquor by passing the liquid through filter screen 66 and withdrawing the same from filter section 64 through line 69. The crystals separated from mother liquor thereafter enter feed arm 13. It is within the scope of the invention to provide conduit 63 with an auger or screw in order to provide positive means for forcing the crystals into the feed arm.

The crystals on entering feed arm 13 are forced downwardly by piston 14 into the end of crystal purification column 10 where they expand and completely fill the column, forming a uniform, compact mass of crystals therein. Piston 14 is forced downwardly and upwardly by means of hydraulic piston 17 which is moved in response to fluid introduced and withdrawn from hydraulic cylinder 18 through lines 19 and 21. By this manner of operation, piston 14 on its compression stroke forces crystals directly into the end of column 10 while on its back stroke crystals are allowed to pass into the feed arm through the operation of piston 32. The repeated operation of piston 14 maintains and establishes the mass of crystals in the column extending from the top of the column to the melting zone maintained in the end of the column by heat exchange means 28. On reaching the melting zone, at least a portion of the crystals are melted, and at least a part of the resulting melt is displaced upwardly as a reflux stream through the downwardly moving mass of crystals and in intimate contact therewith. The reflux stream displaces occluded impurities from the crystals, and at least a portion of this stream refreezes in the crystal mass. A liquid stream comprising displaced mother liquor components is removed from column 10 through filter section 22 by means of line 27 which can be connected to feed inlet line 55 for recycling, if desired, of the liquid to chiller 51. Recycling of the liquid stream withdrawn through line 27 to chiller 51 may be desirable when that stream is as rich in the crystallizable component as the liquid feed mixture. A pure product in the form of melt or a mixture of melt and crystals is withdrawn through line 29.

In operating the appartus of Figure 1, it is important that column 10 at all times be maintained completely full of crystals so that the mass of crystals is uniform and compact without containing any vertical channels, i.e., unobstructed vertically extending paths through which reflux liquid might by-pass a major portion of the crystal mass. If at any time it is desired to remove an increased amount of product through line 29, it is merely necessary to increase the piston speed in order to supply a larger amount of crystals to the column while at the same time increasing the heat input to the bottom of the column. The increased volume of crystals entering the column will completely fill the column and through the operation of piston 14 will be maintained as a uniform, compact mass therein.

In the operation of the apparatus of Figure 2, a liquid stream comprising mother liquor components is withdrawn through filter section 88 disposed in the upper end of purification column 10. By operating with the filter section positioned as in Figures 1 and 2 and in Figure 3 to be described hereinafter, the likelihood of the reflux stream channeling in its passage through the crystal mass is materially lessened. The operation of the apparatus of Figure 2 is otherwise essentially the same as that of Figure 1.

When practicing the process of the invention utilizing the apparatus of Figure 3, a feed mixture containing a crystallizable material is introduced into chiller 96 through line 104. A refrigerant is expanded into the annular space between jacket 101 and cylinder 97 so as to reduce the temperature of the feed sufficiently to crystallize a substantial amount of the crystallizable component. Crystals and mother liquor formed in the chiller are moved by auger 99 through conduit 105 into container 128. Cylinder drum 127 rotates in the crystal slurry in container 128 with the result that a filter cake is formed on the filter medium covering drum 127. During the rotation of drum 127, the filter cake is sucked dry, mother liquor being removed from the filter through line 133. By means of doctor blade 129, crystals are scraped from the filter drum, falling into and through conduit 131 into cylinder 132. The crystals are forced through cylinder 132 by means of piston 134 and pass into tubular member or feed arm 13. As previously mentioned, piston 14 is so constructed that introduction of crystals into the feed arm is possible only when the lower end of the piston is above the entrance end of cylinder 132. The crystals on entering feed arm 13 are forced downwardly by the piston directly into the upper end of crystal purification column 10 where they completely fill the column, forming a uniform, compact mass of crystals therein. Mother liquor which may enter the feed arm along with the crystals is forced upwardly through porous piston 14 and is withdrawn from the feed arm through line 136. Piston 14 is forced downwardly and upwardly by means of hydraulic piston 17 which is moved in response to fluid introduced into and withdrawn from hydraulic cylinder 18 through lines 19 and 21. By operating in the described manner, piston 14 on its compression stroke forces crystals into the end of column 10 while on its backstroke, crystals are allowed to pass into the feed arm through the operation of piston 134. The repeated operation of piston 14 maintains and establishes the mass of crystals in the column extending from the top of the column to the melting zone maintained in the end of the column by heat exchange means 28. On reaching the melting zone, the crystals are melted, and a portion of the resulting melt is passed upwardly as a reflux stream through the downwardly moving mass of crystals and in intimate contact therewith. A liquid stream comprising mother liquor components is removed from column 10 through filter section 137 by means of line 27. A purified product comprising melt or a mixture of melt and crystals is removed from column 10 through line 29.

In practicing the process of this invention utilizing one of the fractional crystallization apparatus as described above, the reflux stream passes countercurrently to the movement of crystals through the combined effect of withdrawing only a portion of the melt from the melting zone of the crystal purification column and the liquid displacing action of the uniform, compact mass of crystals moving through the column. The high purity of product obtainable is believed to be due at least in part to the washing action of the reflux stream passing through the column in intimate contact with the crystals and may be due in part to refreezing of reflux liquid. Other fractional crystallization apparatus which utilize a reflux stream similarly to obtain a high purity product are disclosed by me in my copending application previously referred to in my specification. By utilizing the expanded crystal purification column of this invention, the capacity of the crystallization apparatus can be substantially increased in terms of gallons per hour in relation to the area of the feeding means by merely increasing the speed of operation of the feeding means. Where the area of the feeding means and the purification column are the same, the capacity of the apparatus is limited by the diameter of the column and the capacity of such a column cannot be increased as contemplated by this invention.

By carrying out the separation and purification of a liquid mixture utilizing the process of this invention, it is possible to produce a high purity product while at the same time obtaining the product at an increased rate. It is to be understood that it is not intended to limit this invention to the recovery of the higher melting product, but it is within the contemplation of the invention to concentrate dilute solutions in which case the mother liquor will be recovered as product.

As will be evident to those skilled in the art, various modifications of this invention can be made or followed in the light of the foregoing disclosure and discussion without departing from the spirit or scope of the invention.

I claim:

1. Apparatus for separation of constituents of a liquid mixture which comprises, in combination, an elongated closed purification column; a single feed arm in communication with one end of and extending into said column, said feed arm being substantially smaller in cross-sectional area than said column; a heat exchange means communicating with the opposite end of said column and outlet means for withdrawing purified product therefrom; a crystal mover in said feed arm, said mover being adapted to positively move crystals at least up to the upstream end crystalwise of said column and adapted to displace crystals from said column; crystal inlet means connected to said feed arm; and a filtering means in the upstream end crystalwise of said column adjoining the walls of the column and the portion of the feed arm extending into the column.

2. The apparatus of claim 1 in which said crystal mover comprises a reciprocating piston, said piston being adapted to completely block said crystal inlet means at the end of its compression stroke while extending at least up to the upstream end crystalwise of said column.

3. The apparatus of claim 1 in which said crystal mover comprises an auger, the delivery end of said auger being positioned at about the upstream end crystalwise of said column.

4. Apparatus for separation of constituents of a liquid mixture which comprises, in combination, an elongated closed purification column having a substantially frusto-conical closure member attached to one end; means for melting crystals in a portion of said column and outlet means for withdrawing purified product therefrom; an elongated tubular member having a common axis with said column attached to said frusto-conical member and extending into said column, said tubular member having a substantially smaller cross-sectional area than said column; a crystal inlet means connected to the conical end of said column; an elongated reciprocating piston disposed in said tubular member, adapted to move a substantial distance into said column and adapted to displace crystals from said column; and a filtering means in said column upstream crystalwise of said melting means adjoining the walls of the column and the portion of the elongated tubular member extending into the column.

5. Apparatus for separation of constituents of a liquid mixture which comprises, in combination, an elongated closed purification column; a single feed arm in communication with one end of and extending into said column, said feed arm being substantially smaller in cross-sectional area than said column; a heat exchange means communicating with the opposite end of said column and outlet means for withdrawing purified product therefrom; a crystal mover in said feed arm, said mover being adapted to positively move crystals at least up to the upstream end crystalwise of said column and adapted to displace crystals from said column; an annular filtering means in the upstream end crystalwise of said column attached to the walls of the column and the portion of the feed arm extending into the column; crystal inlet means connected to said feed arm; a crystal mover in said crystal inlet means; and a rotary filter means adapted to discharge crystals into a conduit communicating with said crystal inlet means.

6. The apparatus of claim 4 in which the filtering means is a perforated, substantially frusto-conical member.

References Cited in the file of this patent

UNITED STATES PATENTS

| | | | |
|---|---|---|---|
| 990,053 | Leitenberger | Apr. 18, | 1911 |
| 2,613,136 | McKay | Oct. 7, | 1952 |
| 2,615,793 | Weedman | Oct. 28, | 1952 |
| 2,617,274 | Schmidt | Nov. 11, | 1952 |
| 2,624,565 | Kompart | Jan. 6, | 1953 |
| 2,637,749 | Aston et al. | May 5, | 1953 |
| 2,657,555 | Wenzelberger | Nov. 3, | 1953 |
| 2,683,178 | Findlay | July 6, | 1954 |
| 2,731,456 | Weedman | Jan. 17, | 1956 |
| 2,747,001 | Weedman | May 22, | 1956 |
| 2,751,890 | Rush | June 26, | 1956 |
| 2,758,141 | Findlay | Aug. 7, | 1956 |
| 2,765,921 | Green | Oct. 9, | 1956 |